Patented July 3, 1945

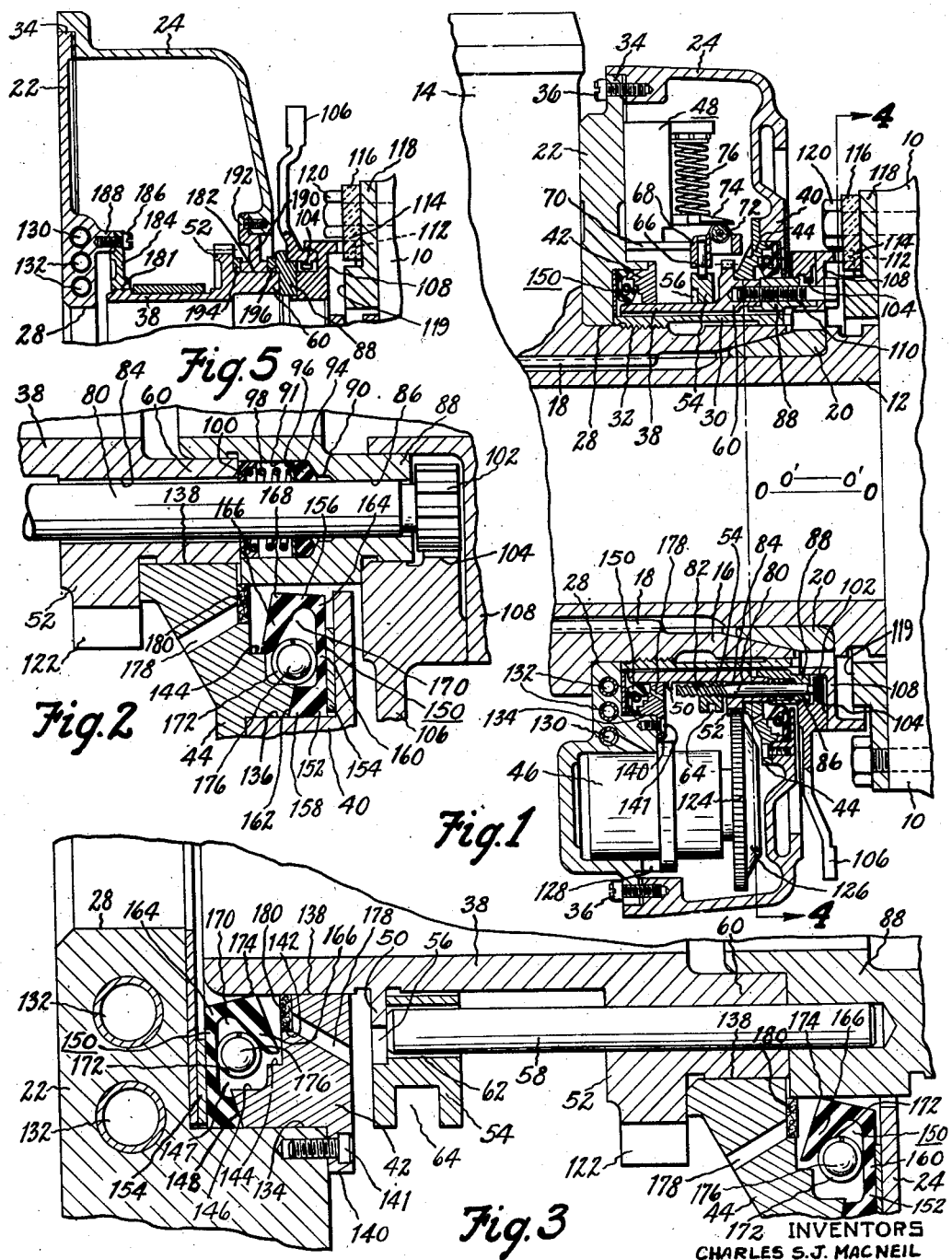

2,379,537

UNITED STATES PATENT OFFICE 2,379,537

AUTOMATIC REGULATOR

Charles S. J. MacNeil, John Fenimore Haines, Thomas Bernard Martin, and Kenneth L. Berninger, Dayton, Ohio, assignors to General Motors Corporation, Detroit, Mich., a corporation of Delaware Application August 26, 1942, Serial No. 456,234

7 Claims. (Cl. 170—163)

This invention relates to controllable pitch propeller mechanism and more particularly to regulating devices therefor.

It is a principal object to provide a self contained regulator unit capable of retaining a predetermined amount of fluid pressure medium for supplying actuating mechanism in fluid circuit therewith so that the said mechanism will not be rendered ineffective, in whole or in part, due to want of the fluid medium.

A further object is to perfect the juncture of a housing member relatively rotatable with respect to a part projecting into the same, so that a reservoir provided by the relatively rotatable parts may be maintained against undue leakage of a contained fluid medium.

A further object of the invention is to provide a reservoir rotatable about a fixed sleeve with bearing means, so that, should the axes of reservoir rotation and bearing means be eccentric, the fixed sleeve will not cause undue wear of the bearings and/or result in leakage from the reservoir.

A still further object is to provide a means for sealing a reservoir rotatable with an aircraft propeller, and for maintaining concentricity of a rotatable housing and a fixed extension into the same, whereby there will be less wear of the relatively moving parts.

A still further object is to provide a self contained regulator for a controllable pitch propeller, in which a reservoir is mounted on the hub to rotate therewith, about an inwardly projecting substantially concentric relatively fixed member for closing off the reservoir as a substantially sealed and self contained source of fluid pressure medium.

In controllable pitch propellers of the class described herein, or where a regulator mechanism is self contained and rotates with the propeller and has manual control mechanism for adjusting the response of the mechanism, there is need for a relatively stationary or fixed part of the regulator mechanism to be journalled to the rotating part of the regulator for the following reasons: to provide concentric relation for allowing the seals to work properly, to provide a definite endwise location for operation of the governor, to provide concentric relation for proper meshing of the pump driving gears; and on the other hand, to avoid elaborate installation adjustments for locating the governor control with respect to the governor mechanism, and to simplify the propeller installation by eliminating the necessity for bolting a part of the propeller to the engine which becomes a very awkward operation, there is also need for a wide latitude of mounting between the fixed part of the regulator and the engine housing.

An aid toward that end is, in part provided by the engine manufacturer, in so far as he furnishes a pilot ring at the outside end of the propeller shaft casing. That pilot ring is among other things, permanently affixed to the casing and designed for locating the axis of shaft rotation, though its geometric center may in fact be out of exact coincidence with the axis of shaft rotation. The pilot ring, or the member, providing it may not be located in a plane exactly perpendicular to the axis of shaft rotation, on the other hand, the shaft itself may be deflected or eccentric to the axis of rotation, or there may be eccentricity within the propeller structure between the shaft and rotating regulator parts. If either condition obtains, great difficulty is had in mounting any structure on the propeller shaft that is to rotate accurately with respect to the propeller shaft casing providing the pilot ring, or with respect to a part extending from the pilot ring or casing. Thus while structure mounted on the shaft and intended to rotate with the shaft will rotate as a whole about the shaft axis of rotation there may in fact be non-coincidence between the axis of rotation of the propeller and the geometric center of the pilot ring on the shaft casing, or between the axis of rotation of the propeller and the geometric center of the rotating parts carried by the shaft, or yet between the geometric center of the rotating parts carried by the shaft and the geometric center of the pilot ring on the shaft casing.

It is therefore a further object to divorce all requirements of exact location, concentricity, and squareness as respects the propeller shaft with its mountings in relation to a propeller mechanism and regulator mounted thereon and particularly in relation to the latter.

It is another object to provide a mounting for a normally fixed part of the regulator mechanism so that the fixed part bears a known location and relation to the associated and relatively rotatable parts of the regulator mechanism, through which said fixed part is susceptible of mounting within a relatively wide range of limits with respect to other fixed parts.

Another object is to provide a relatively rotatable mounting for the control means of a regulator which bears a known relation to the mechanism or mechanisms to be controlled.

Another object is to provide a relatively fixed inner wall or tube for a rotating device whose mounting is capable of providing a satisfactory fluid sealing arrangement.

Another object is to effect controlled movement of parts within a rotating assembly from an outside fixed point, though axes of rotation and geometric center are non-coincident.

A further object of the invention is to provide an adapter assembly fixed with respect to a casing supporting a rotatable shaft and having a portion extending into a rotatable housing carried by the shaft where it closes off the housing to form a reservoir for a fluid pressure operating medium, there being provisions manually operable from without the reservoir for selectively actuating control units situated within the casing.

An additional object of the invention is to provide a reservoir rotatable about a tubular member projecting into the reservoir to close it off in fluid tight relation with transmission means in the form of screw-shafts for effecting axial motion of a control ring carried by the tubular member within the reservoir and adapted to be controlled from a point outside of the reservoir.

Yet another object is to provide transmission means by which mechanism mounted with a reservoir rotating about an axially disposed relatively fixed member, can be adjusted at will and from the outside of the reservoir while the reservoir is rotating.

Among other objects, some of which will be observed as the detailed description proceeds, it is an object to close off one wall of a rotating fluid chamber by means of a relatively fixed or nonrotating part projecting into the chamber and having bearing engagement with the rotating part that is devoid of eccentricity so that rotation of the chamber will be concentric with respect to the nonrotating part despite the orbital movement of the fixed part with respect to propeller drive shaft.

Further objects and advantages of the present invention will be apparent from the following description, reference being had to the accompanying drawings wherein a preferred embodiment of the present invention is clearly shown.

In the drawings:

Fig. 1 is a longitudinal sectional view through a propeller mechanism embodying the instant invention.

Fig. 2 is an enlarged sectional view illustrating a detail of the construction.

Fig. 3 is a similar enlarged sectional view illustrating other features of the invention.

Fig. 5 is a view in section, illustrating a modification of the invention.

Figure 4:
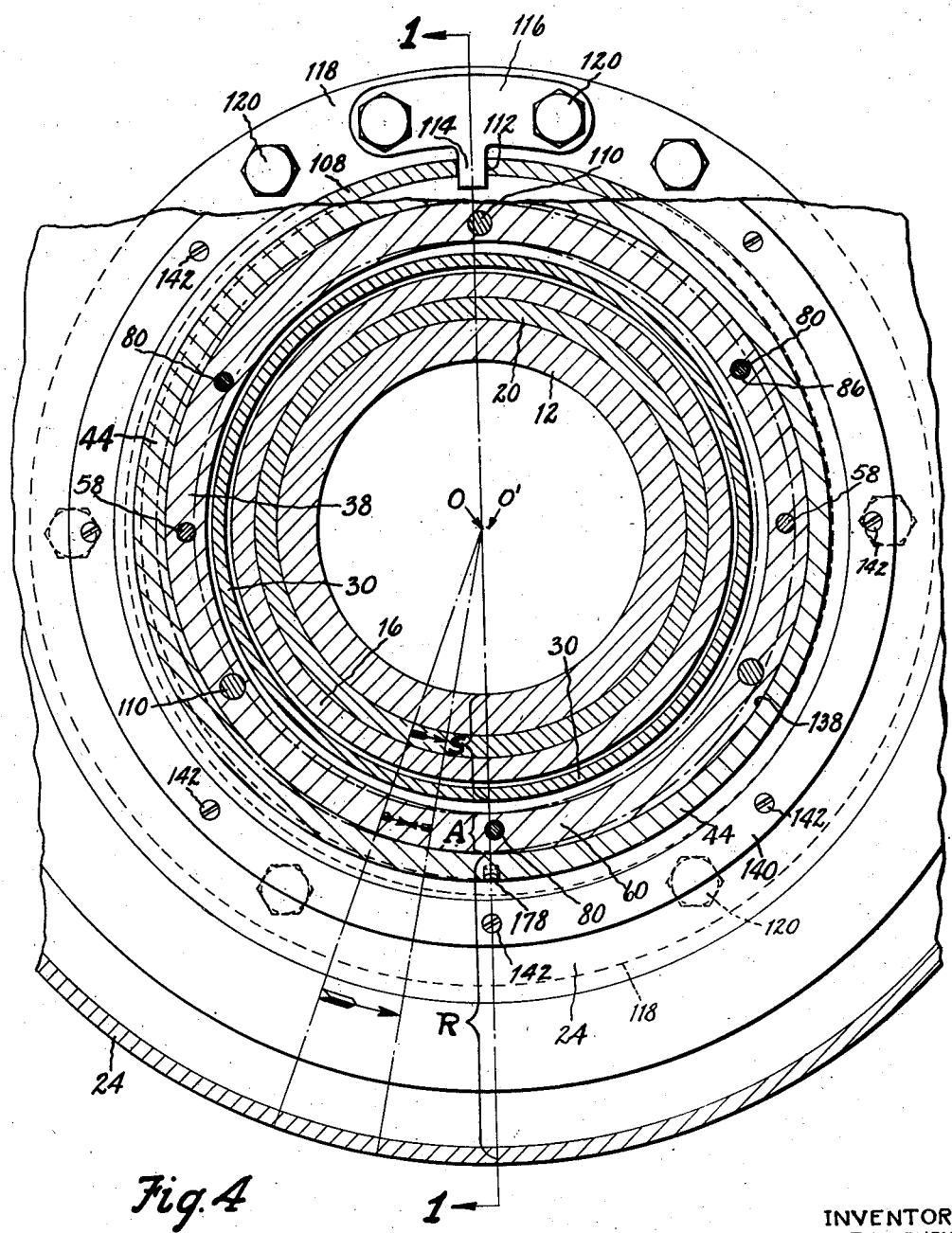
Fig. 4 is a greatly enlarged transverse sectional view through the propeller control mechanism substantially as indicated by the line and arrows 4—4 of Fig. 1.

Referring particularly to the drawings 10 illustrates a part of the engine casing, forwardly from which projects an engine driven shaft 12 drivingly supporting a propeller having blades secured in sockets 14 provided by a hub having a rearward extension 16 driven through the agency of splines 18 and seated against a rear cone 20. Mounted on the hub for instance concentric with the hub sleeve 16 there is a regulator housing comprising a plate 22 to which is affixed a cover member 24. The plate 22 is annular in form such that its inner periphery 28 closely embraces the cylindrical portion 16 of the sleeve where it is maintained by means of a sleeve nut 30 threaded onto the sleeve 16 at 32, the forward end of the sleeve nut 30 forcing the plate 22 against the radiating socket portions 14.

The cover member 24 telescopically engages over the rim 34 of the plate 22 where it is held in sealed relation by means of screw device 36. For closing the inner boundary of the reservoir that is provided by the members 22 and 24, an adapter assembly is provided that makes use of a tubular extension 38 surrounding the sleeve nut 30 loosely and extending across the space between the plate 22 and the parallel wall 40 of the cover 24. The inner boundaries of both the members 22 and 40 are circumferentially recessed to receive bearing members 42 and 44 respectively that are interposed between their respective supporting members and the tubular extension 38, thus completing the enclosure as a reservoir that may be charged with a predetermined amount of operating fluid. That is, an annular or ring like chamber is supported by the propeller hub, and surrounds the drive shaft and hub sleeve. It is provided by the plate member 22, the cover 24, the bearing member 42, 44 and the tubular extension 38. Within the reservoir so constituted, there is provided regulating and control mechanism that embraces a pump 46, a governor mechanism 48, and perhaps relief valves, breather valves and the like, each and all operating on or by reason of the fluid medium contained with the reservoir.

The tubular extension 38 forms part of an adapted assembly as has been stated, and also forms a support for adjusting and operating mechanism by which manual control is effected for the elements enclosed within the reservoir, and by which power is applied to the fluid circulating means 46. Directed toward support of the adjusting mechanism the sleeve 38 is provided with circumferentially aligned flange portions 50 disposed to be adjacent the bearing member 42, and spaced axially thereof is provided a tooth flange 52. These flanges 50 and 52 provide stops for axial movement of a control ring 54 embracing the intervening portion of the sleeve 38. The inner periphery of the control ring 54 is appropriately notched such that the ring may be telescopically passed over the flange portions 50 and thence it may be turned or rotated to bring about the relation existent in Fig. 3. In order to gain the full extent of possible movement between the stops 50 and 52 one end face of the control ring is arcuately notched as at 56 to receive the flange portions 50 at one extreme of movement. To keep the control ring 54 in proper alignment dowel pins 58 secured in a thickened flange 60 of the sleeve 38 and extend across the space between the stop flanges and engage bores 62 so that the control ring in moving axially of the sleeve 38 may be guided by the dowel 58 as it slides over it. In the outer periphery of the control ring 54 there is a groove 64 adapted to receive a shoe member 66 of a slide block 68 movable upon guides 70 and carrying a fulcrum roller 72. The fulcrum roller 72 supports one end of a lever 74 biased by a spring 76 for movement of the governor valve forming a part of the mechanism 48. Movement of the control ring 54 thus carries the slider 68 along the guides 70 and in doing so either lengthens the moment arm of the lever 74 between the fulcrum 72 and the line of spring force 76 and in that way alters the effect of the control mechanism 48.

As a means for moving the control ring 54 along the sleeve 38 and between the limits afforded by the stop flanges 50 and 52, a plurality of shafts 80 are provided that have threaded portions 82 received by complementary threaded portions of the ring 54. The shafts 80 are likewise received by enlarged bores 84 through the flange 52 and thickened portion 60 of the sleeve 38 but are of sufficiently greater diameter than the shafts 80 as to provide a substantial clearance whereby possible weave and gyration of the shafts may be permissible.

The screw shafts 80 have a journal bearing 86 in a ring 88 aligned with and held in end to end engagement with the sleeve 38 by means of the dowels 58, the ring 88 having sockets 90 for that purpose. The ring 88 is counterbored at 91 about the shaft 80 and in line with the journal bearing 86, for reception of a fluid seal 94 backed up by a washer 96 and a spring 98 seated against a ring 100.

For operating the screw shafts 80 there is provided a pinion 102 on the end of each shaft where it projects through the journal bearing 86. Mounted to slide circumferentially about the ring 88 there is a ring gear 104 that meshes with the pinions 102, an arm 106 adapting the ring for either automatic or manual operation as may be desired. Acting as a keeper and a thrust member for the ring and pinion there is a flanged ring 108 that provides a backing for screw devices 110 passing through the ring 108, the ring 88 and threading into the thickened portion 60 of the sleeve 38. When these parts are thus assembled and secured by the screw device 110 the adapter assembly is complete, and the reservoir with hub attached is ready for mounting upon the engine shaft 12 as a single unit of assembly.

In assembling the propeller with its regulator mechanism the hub sleeve 16 is passed over the shaft 12 with the splines 18 in registry. As the assembly nears the seating position between the rear cone 20 and the rearward incline of the hub sleeve 16 the adapter assembly is rotated with respect to the engine casing 10 until a notch portion 112 of the ring 108 is in receptive relation with a lug 114 of a composition plate 116 secured against the cover plate 118 of the engine casing 10 by means of screw devices 120. Thence the propeller hub and regulator assembly is forced into seating relation and the shaft nut applied to retain the parts in assembled relation. The cover plate 118 supports a pilot ring 119 whose outer diameter is supposed to be geometrically concentric with the axis o—o of shaft rotation. Under those conditions of assembly the adapter assembly will be relatively fixed against rotation relative to the engine casing in consequence of which the reservoir or rather the housing members comprising it will rotate about the sleeve portion 38 and presumably concentric with the pilot ring 119 since the propeller manufacturers dimension the hub and regulator with respect to the data given him on the shaft and piloting plate by the party or division building those parts. The manner of retaining the adapter assembly against rotation, but not firmly attaching it to the engine casing permits the sleeve portion 38 to always continue in a condition of concentricity with respect to the bearing members 42 and 44 of the reservoir housing though it may not remain concentric with the pilot ring. Thus if the bearing surfaces of the members 42 and 44 are not exactly concentric with the shaft 12, it is possible for the sleeve 38 to weave with respect to it in following the concentricity of the bearing members.

Directed toward application of power for driving the pump 46 the stop flange 52 is provided with gear teeth 122 that mesh with the teeth 124 of a pump driving gear 126. The pump 46 is wholly contained within the reservoir and has an inlet 128 so that it may withdraw medium from the reservoir and deliver it to a pressure supply line 130 which leads to control passages of the governor mechanism 48 from which it is selectively delivered to one or more passages 132 but all of which is unnecessary of description here inasmuch as it forms no part of this invention and is elsewhere described in companion cases. It should however be observed that rotation of the propeller carries with it the regulator housing and causes the parts 22 and 24 and the associated bearings 42 and 44 to rotate about the sleeve 38.

When the reservoir is conditioned for automatic control of the selected devices, it is partially filled with a fluid medium. Under a condition of rest this fluid medium would be likely to seep out from between the inner periphery of the bearing members 42 and 44 and the engaged portions of the sleeve 38. Though care in manufacturing may result in such close fit of those parts as to preclude any substantial amount of leakage, such fits are undesirable and cannot be relied upon for that purpose. It will be recalled that under a state of rotation, the fluid medium partially filling the reservoir will in consequence of centrifugal forces acting upon the medium be centrifuged to the perimetric wall 24 of the reservoir, leaving a radial and inwardly disposed annular void or air space between the inner surface of the medium and the sleeve 38. At normal filling of the reservoir that void or annular space might extend from the sleeve 38 radially outward to near the outer perimeter of the bearing members 42 and 44. Therefore under those conditions there would be no leakage between the bearing surfaces of the sleeve 38 and the members 42 and 44 during rotation. However, as the aircraft gains or loses altitude it is desirable that the air pressure within and without the reservoir be equalized, so that upon secession of rotation there will not be loss of the fluid medium by reason of a greater internal pressure at a time when the fluid medium might cover running surfaces of the bearings. Thus, centrifugally operated valve means are provided in association with the bearings 42 and 44, so that the housing forming a reservoir may be substantially sealed against fluid flow through the bearings while the apparatus is at rest, and such that when a condition of rotation is accomplished that will remove the fluid medium from contact with the sleeve 38, then free fluid flow between the interior and exterior of the casing will be accomplished.

Therefore, in mounting the bearings 42 and 44 the respective supporting members, that is the plate 22 and cover 24 are circumferentially grooved at 134 and 136 respectively for reception of the corresponding bearing members. Aside from the difference in over-all dimension the bearing members 42 and 44 are substantially alike such that a description for one will suffice for the other. Thus, the bearing member 42 has its inner diameter 138 providing a bearing surface engaging the outer surface of the sleeve 38 while its outer periphery closely fits against the peripheral wall of the groove 134, an outwardly extending flange 140 being receptive of cap screws 141 threaded into the body of the plate 22, for securing the bearing in place. That portion of the bearing ring projecting axially into the groove 134 is successively stepped at 142, 144 and 146 while the edge is chamfered off at 148 to provide an outward overhang. The stepping of the bearing member provides an annular recess 147, which may be called a valve chamber, and is substantially enclosed by a portion of the sleeve 38, the bearing member and the supporting plate for the reception of a centrifugally operated valve 150.

The details of the centrifugally operated valve 150 are shown in the enlarged views Figs. 2 and 3, where a resilient ring 152 of rubber or rubber like material is bonded to a backing member 154 and disposed in the peripheral groove 134 or 136 to substantially fill the annular recess or valve chamber above referred to. The resilient ring preferably is of the contour illustrated and is molded in such form that its unstressed contour will be substantially as indicated in Fig. 2. Specifically the resilient ring 152 may be said to comprise a pair of concentric rings including an inner ring portion 156 and an outer ring portion 158 joined by an integrally connected web portion 160. The outermost ring portion 158 is chamfered at one edge 162 to mate with the chamfered edge 148 of the associated bearing members. The opposite end of the ring portion 158 and the connecting web 160 along with one end of the ring portion 156 in the normal unstressed condition of the pivot ring lie within a single plane. The backing member 154 comprises a rigid metal annulus extending from the outer periphery of the resilient ring inwardly for about two thirds of the radial dimension of the resilient ring such as to leave the inward portion 164 of the web where it is joined to the innermost ring 156 free for a certain amount of flexing. At the opposite end of the innermost ring 156 from that joined to the web 160 there is an outwardly extending circumferential flange 166 having its juncture 168 somewhat thickened so as to add an additional mass to the normally free end of the ring 156, and so as to form a wedge shape groove 170 between the flange 166 and the web 160. In the free or unstressed condition of the resilient ring the outward edge of the flange 166 may engage the step 144 of the bearing such as to provide a stop or abutment against outward distortion of the flexing portion of the valve member. Disposed within the groove 170 there is a garter spring 172 so stressed as to normally engage the proximate sides of the web 160 and flange 166 thereby causing the engaged members to spread substantially as indicated in Fig. 3. That spreading will cause the resilient member to flex and bend at the juncture of the web 160 and ring 156 somewhat as indicated in Fig. 3, and will bring the edge 174 of the inner ring into continuous embracing relation with the adjacent portion of the adapter assembly. Thus, normally under stress of the the garter spring 172, the inner ring portion will engage the cylindrical surface of the adapter assembly and prevent fluid flow between the adapter assembly and the resilient ring. In other words a seal is effected.

So that the innermost ring 156 may disengage the adapter assembly when a predetermined speed of rotation has been accomplished weight members consisting of steel balls 176 or the like are lodged within the confines of the garter spring 172 which respond to the speed of rotation to stretch the garter spring so that it may be moved outwardly of the groove 170. It may in fact move outwardly so far as to engage the step 146 of the bearing member which acts as a stop therefor. As the garter spring stretches and moves radially outward, centrifugal force acting upon the flange 166 of the resilient ring combined with the inherent resiliency of the ring between the edge of the backing member 154 and the attachment to the flange causes the edge portion 174 to disengage the adapter assembly so that fluid flow will be established between the members.

Communication is afforded between the valve chamber 147 and the interior of the reservoir by means of bores or drillways 178 extending from the bottom of the step 142 diagonally and radially outward of the center of rotation as most clearly shown in Figs. 2 and 3, these drill-ways principally operating as drain passages between the valve chambers 147 and the reservoir. Disposed in the peripheral groove afforded by the step 142 of each bearing there may be lodged a fibrous ring 180 such as felt or the like which tends to arrest fluid flow outward through the passage 178 into the valve chamber 147.

In the modification shown in Fig. 5, the centrifugal valve mechanism has been omitted, and dependence placed on the maintained fit of bearing surfaces to prevent leakage of the pressure medium. The adapter sleeve 38 provides bearing surfaces 181 and 182 at the fore and aft ends respectively. A bearing ring 184 closely engages the bearing surface 181 and is secured to the plate 22 at its outer boundary by such devices as screws 186 threaded into a flange or web 188. The bearing surface 182 is disposed around the thickened portion 60 of the adapter sleeve and extends between the toothed flange 52 and the guide ring 88. The bearing ring 190 engages the surface 182 and is supported from the cover 24 by such devices as screws 192. Spacers 194 and 196 disposed on either side of the bearing ring 190 act as thrust members preventing axial movement of the adapter sleeve with respect to the bearing rings 184 and 190 and tend to reduce scoring of the bearings even under continued usage.

Referring to the view of Fig. 4, it will be noted that the elements of structure may be divided into three general groups, which for the purpose of description have been indicated by brackets labeled as "S," the shaft group, "A" the adapter group, and "R" the rotative group. The shaft group "S" are all concentric about the point o, the axis of shaft rotation, while the groups "A" and "R" are supposedly concentric with the axis of rotation but may in fact present the bearing surfaces 138 as centered around the point o' to one side of or not coincident with the axis of rotation. When that is the case and the propeller is rotating, then the point o' will describe a circle or curved path about the axis of rotation, and the elements of the "A" group will wabble somewhat as designated by the dotted and dashed lines. That is possible in the present instance because all of the elements of that group while relatively fixed against rotation with the propeller may at the same time oscillate to follow the eccentricity. The lug and notch engagement between the plate 116 and ring 108 restrain the adapter assembly from rotation, yet permit the desired oscillation so that the relative rotation of the bearing rings is truly concentric with the center of the adapter sleeve 38.

In aircraft constructions of the type disclosed, one manufacturer may provide the power plant ending in the propeller shaft 12 and its support, while another manufacturer may provide the propeller mechanism to be mounted thereon. Both manufacturers must work to close tolerances for the assemblies they provide, but by reason of separation of manufacturing plants there is introduced considerable likelihood that the reference point of the two sets of tolerances may not coincide. In any event, when the propeller mechanism is mounted in position on the propeller shaft, the exact location may be outside of the limits specified, or the adapter bearings may not be concentric with the shaft axis, or the plane of the bearings may not be square with the shaft. On the other hand, an aircraft while maneuvering, is subjected to a complexity of forces that are concentrated at the juncture of propeller and driving shaft. In effect a substantial mass in the neighborhood of hundreds of pounds is carried at the end of a stub-shaft, and incident to dive, climb, and turn of the aircraft may cause same to weave or whip and chuck of the propeller shaft and mechanism mounted thereon. Any or all of that gives rise to shift, though perhaps small, of the propeller and its parts with respect to the propeller shaft support 10. By mounting the adapter assembly in the manner stated, it is permitted to follow all of the weave and chuck movement transmitted to the bearing members 42 and 44, without altering its designed relation with the reservoir housing or the control mechanism connected therewith. At the same time, the adapter assembly is retained against rotation with respect to the shaft support 10, so that it may efficiently perform its functions in transmitting control movement applied to the arm 106 to the pitch control mechanism regardless of whether the propeller mechanism is at rest or rotating.

The full effect of the applied control movement applied to the arm 106 is maintained because the adapter sleeve is maintained concentric with, and non-shiftable axially of the bearings afforded by the reservoir housing. The bearing 44 may be in lapped relation between the flange 52 of the adapter sleeve, and the abutting end of the ring 88, all of which is shown in Fig. 3. In Fig. 5, a like result is accomplished by the spacers 194 and 196 on either side of the bearing member 190, and it is obvious that one or more spacers may be used, if desired, with the form of structure shown in Figs. 2 and 3.

While the embodiment of the present invention as herein disclosed, constitutes a preferred form, it is to be understood that other forms might be adopted, all coming within the scope of the claims which follow.

What is claimed is as follows:

1. A propeller control mechanism of the character described, comprising in combination, a propeller hub rotatable with respect to a fixed support, a housing rotatable with said hub, a relatively stationary member projecting into said housing, means for establishing a fluid seal between the housing and said stationary member providing a reservoir within said housing for receiving a quantity of fluid pressure medium, said seal means comprising a journal bearing for supporting the stationary member, and a plane surface bearing preventing relative axial movement between the stationary member and housing, means restraining the stationary member against rotation with respect to a fixed support but permitting its geometric center to describe said circular path about the axis of hub rotation, whereby the fluid seal between the housing and stationary member is maintained during rotation of the hub though the axes of rotation for the hub and housing are noncoincident.

2. In a propeller control mechanism of the class described, the combination comprising, a casing from which projects and within which a propeller shaft is rotatably supported, a propeller hub rotatable with the shaft, a housing concentrically arranged and rotatable with the hub with respect to the casing, a cylindrical member surrounding the hub and projecting into the housing, means providing pairs of axially spaced bearing surfaces between the housing and the cylindrical member for closing off a reservoir within the rotatable housing, one of said pairs of bearing surfaces comprising pairs of axially spaced plane surface bearings restraining relative axial movement of the cylindrical member and housing, means including a part of the casing preventing relative rotation of the cylindrical member yet permitting relative oscillatable movement of the cylindrical member with respect to the casing, said shaft being capable of rotation on an axis non-coincident with the axis of said bearing surfaces.

3. A self-contained propeller control mechanism comprising, a gear casing, a hub supporting propeller blades, a shaft extending from and rotating with respect to said casing for mounting and driving said hub, an annular housing extending around the shaft and rotatable with the hub, a sleeve member disposed about the shaft and extending into the housing, said housing engaging the sleeve at one end in a journal bearing for support of the sleeve, and engaging at the other end of the sleeve in opposed plane surface bearings for elimination of axial movement of the sleeve relative to the housing, and means located on the casing for preventing rotation of the sleeve with the shaft but permitting lateral movement thereof.

4. A propeller control mechanism of the character described, comprising a propeller hub, a shaft carrying the hub, substantially annular shaped member mounted adjacent and rotatable with the propeller hub, a pump, and a governor valve mechanism all mounted for rotation with the hub, an outer annular housing engaging said annular member and extending over said pump and governor mechanism, said annular member and annular housing both having their inner peripheries normally open and unobstructed and being receivable over the propeller shaft, an adapter assembly for closing the inner periphery of the annular member and housing to form a reservoir enclosing the pump and the governor valve mechanism, said adapter assembly including a sleeve having bearing engagement with the inner peripheries of the annular member and housing, means on the sleeve within the reservoir for operating the pump upon rotation of the hub, means provided by the adapter assembly and disposed on either side of the said bearing engagement for preventing axial movement of the adapter assembly relative to the housing and annular members, means without the reservoir preventing rotation of the adapter assembly, and means embodied in the adapter assembly constantly operable from without the reservoir for adjusting the governor valve while the reservoir is rotating.

5. In a regulator for an aircraft propeller, wherein a propeller is driven by a shaft rotatably extending from an engine housing, the combination comprising, a reservoir mounted for rotation with the propeller, an adapter assembly comprising a tubular extension projecting into the reservoir, bearing means between the tubular extension and reservoir, means permitting of the adapter assembly axially of and normal to the engine housing, means comprising a part of said bearing means for preventing axial movement between the tubular extension and reservoir, and means comprising a part on the engine housing for preventing rotation of the adapter assembly with respect thereto.

6. In self contained propeller control mechanism for a hydraulically adjustable propeller, the combination comprising, a hub supporting propeller blades, and mounted to be driven by a shaft extending from and rotating with respect to an engine casing, an annular housing extending around the shaft and rotatable with the hub, a sleeve member disposed about the shaft and extending into the housing, said housing and sleeve engaging in a journal bearing and a planar bearing and providing a reservoir for receiving a quantity of pressure actuating fluid, and means for preventing rotation of the sleeve with the shaft but permitting fore and aft movement of the sleeve with respect to the engine casing, said planar bearing preventing fore and aft movement of the sleeve relative to the annular housing.

7. In a propeller control mechanism of the class described, the combination comprising, a casing from which projects and within which a propeller shaft is rotatably supported, a propeller hub rotatable with the shaft, a housing rotatable by the hub relative to the casing, a cylindrical member surrounding the shaft, a journal bearing means between the housing and cylindrical member by which the cylindrical member is supported from the housing, plane surface bearing means between the housing and cylindrical member by which axial movement between the housing and cylindrical member is prevented, and means preventing the cylindrical member from rotating relative to the casing, yet permitting floating of the cylindrical member relative to the propeller shaft during propeller rotation.

CHARLES S. J. MacNEIL.
JOHN F. HAINES.
THOMAS B. MARTIN.
KENNETH L. BERNINGER.

CERTIFICATE OF CORRECTION.

Patent No. 2,379,537. July 3, 1945.

CHARLES S. J. MacNEIL, ET AL

It is hereby certified that error appears in the printed specification of the above numbered patent requiring correction as follows: Page 1, second column, line 47, for "through" read --though--; page 5, first column, line 68, claim 1, for the article "a" read --said--; and that the said Letters Patent should be read with this correction therein that the same may conform to the record of the case in the Patent Office.

Signed and sealed this 16th day of October, A. D. 1945.

Leslie Frazer (Seal) First Assistant Commissioner of Patents.